Patented Apr. 24, 1945

2,374,471

UNITED STATES PATENT OFFICE 2,374,471

PROCESS FOR THE PREPARATION OF HIGHLY POTENT VITAMIN CONCENTRATES

Loran O. Buxton, Belleville, N. J., assignor to National Oil Products Company, Harrison, N. J., a corporation of New Jersey No Drawing. Application September 12, 1941, Serial No. 410,580

13 Claims. (Cl. 260—397.2)

This invention relates in general to the preparation of vitamin concentrates, and more particularly to the preparation of highly potent concentrates of vitamin A and highly potent concentrates of vitamin D from fish liver and other marine oils.

It is well known that the fish liver oils and other marine oils constitute the richest natural sources of vitamins A and D. For some time it has been a common practice to saponify these oils and to separate the unsaponifiable mate- can be separated from the vitamins only with a suitable solvent such as heptane, ethylene dichloride, etc. The unsaponifiable fraction thus obtained contains the vitamins A and/or D in their saponified form, i. e., alcoholic form. In most cases this unsaponifiable fraction contains relatively large quantities of biologically inactive materials, many of which have a rather objectionable odor and taste, and which are so similar to vitamins A and D in their solubility characteristics and molecular weight that they can be separated from the vitamins only with extreme difficulty. At the present time there is no practical commercial method for effecting a satisfactory separation of these constituents from the vitamins. Moreover, there has hitherto been no commercially practical method for separating the vitamin A from the vitamin D. It has been proposed to separate these two vitamins from each other by a large number of successive fractional crystallizations. However, such a method, although it will give fairly satisfactory results on a laboratory scale, is not feasible for commercial practice as it is too costly, complicated and time-consuming.

It is the object of this invention to provide a commercially practicable, efficient process for preparing highly potent concentrates of vitamin A and highly potent concentrates of vitamin D from fish and fish liver oils.

A further object of this invention is to provide a commercially practicable, efficient process for the treatment of the unsaponifiable portion of fish liver and other marine oils to separate the vitamins contained therein from the non-vitamin materials.

Another object of this invention is to provide a commercially practicable, efficient process for treating the unsaponifiable portion of fish oils to separate the vitamin A from the vitamin D therein.

Other objects of the invention will in part be obvious and will in part appear hereinafter.

The foregoing and other objects may be realized according to the invention by dissolving the unsaponifiable fraction of a fish liver oil or other vitamin-containing marine oil in an aliphatic or alicyclic hydrocarbon solvent vehicle and extracting this solution with an aqueous solution of a solvent selected from the group consisting of methanol, ethanol, isopropanol diacetone alcohol, acetic acid and mixtures thereof, the water content of this extracting solution being adjusted so that the vitamin A will be dissolved to the substantial exclusion of vitamin D. Upon completion of the extraction of vitamin A the residue remaining in the hydrocarbon solvent is subjected to the action of an acylating agent, whereby the vitamin D is esterified. Vitamin D esters are then removed from the unesterified mass including hydrocarbons such as squalene by extraction with an aqueous solution of a solvent selected from the group consisting of methanol, ethanol, isopropanol, diacetone alcohol, acetic acid and mixtures thereof, the water content of this extracting solution being adjusted so that the vitamin D esters will be dissolved to the substantial exclusion of the hydrocarbons present including squalene, after which the vitamin D esters are saponified to convert the same back to their biologically active form.

The invention accordingly comprises the several steps and the relation of one or more of such steps with respect to each of the others thereof, which will be exemplified in the process hereinafter disclosed, and the scope of the invention will be indicated in the claims.

In carrying out the process of the invention, it is preferred to start with an unsaponifiable fraction of a fish or fish liver oil which has had at least the major portion of its cholesterol removed. The cholesterol may be removed according to any well known procedure and preferably by the process wherein the unsaponifiable fraction is dissolved in a solvent and chilled whereby the cholesterol solidifies and thus precipitates out. The removal of the cholesterol, the extraction of the vitamin A, and the esterification of the vitamin D may all be carried out in the same solvent. A few of the solvents which may be so used are the aliphatic and alicyclic hydrocarbons, such as pentane, petroleum ether, hexane, heptane, octane, nonane, cyclohexane, methyl cyclohexane, etc. Also compatible mixtures of these and/or other suitable solvents may be used.

Usually it is preferred to use several different solvents in carrying out the complete process.

Thus, in removing the cholesterol in the first step it is preferred to dissolve the unsaponifiable fraction in methanol as it is one of the most efficient solvents for this step. At temperatures substantially below room temperature, i. e., —20° C. or lower, cholesterol is relatively insoluble in methanol, whereas vitamins A and D are quite soluble. Other solvents which may well be used in place of methanol are ethanol, isopropanol, methyl acetate, ethyl acetate, methyl formate and ethyl formate. After removing the cholesterol it is preferred to remove the methanol from the unsaponifiable material and redissolve the unsaponifiable material in an aliphatic or alicyclic hydrocarbon solvent vehicle, such as pentane, hexane, heptane, octane, nonane, petroleum ether, cyclohexane, methyl cyclohexane, etc., before proceeding with the extraction of the vitamin A. Solvents which may be used advantageously to selectively extract the vitamin A from the hydrocarbon solvent solution include, inter alia, aqueous solutions of methanol, ethanol, isopropanol, diacetone alcohol and acetic acid or mixtures thereof, the water content of these solutions being adjusted so that the vitamin A will be dissolved to the substantial exclusion of vitamin D. For example, when using methanol the water content thereof should lie within the range of about 6% to 15% as vitamin A is soluble in 85% to 94% methanol, whereas vitamin D is not. The number of extractions required to remove the major portion of the vitamin A will depend generally upon the type of solvent used, the amount of material to be extracted, the temperature at which the extracting is conducted, the type of material that is being extracted, etc. Either continuous or successive batch extraction processes may be used. In some cases the extracting medium and extracting agent may be slightly soluble in each other; if so, it is preferred that they be saturated with each other before being used, as usually better results will be obtained by so doing. Various extracting agents other than those mentioned above may be used; the principal requisites for such agents being that they be immiscible or relatively so with the extraction medium, and that they will selectively extract the vitamin A. The extraction of the vitamin A may be carried out at room temperature; however, in some instances it may be preferred to extract at a temperature substantially below room temperature as usually more efficient results will be obtained and fewer extractions will be required.

After removal of the vitamin A, an acylating agent is added to the solution of the remaining unsaponifiable material in order to esterify the vitamin D. If desired, the unsaponifiable material may be separated from the solvent used as the extraction medium and dissolved in a solvent such as pyridine or benzene before esterifying. Pyridine is an excellent esterification medium as it also acts as an esterification catalyst and accelerates the reaction. In fact when solvents other than pyridine are used as the esterification medium, pyridine may be added as a catalyst. Other materials which may be used as esterification catalysts are quinoline, piperidine, etc. Usually if either pyridine or benzene is used as the esterification medium, it is removed from the reaction mixture and the mixture dissolved in another solvent before proceeding with the extraction of the vitamin D esters. If benzene has been used it may be readily removed by vacuum distillation, and the residue then dissolved in the solvent in which it is desired to carry out the subsequent extraction step. In the case of pyridine, it may be removed in the same way as benzene; or the solvent in which it is desired to carry out the extraction step may be added to the pyridine solution of the reaction mass, and the pyridine then removed by washing the whole mixture with a suitable material, such as acidified 50% methanol, after which the selective extraction of the vitamin D esters is carried out. The same hydrocarbon solvents set out hereinabove as suitable for use as the extraction media in the removal of the vitamin A are also well adapted for the same purpose in the extraction of the vitamin D esters.

Various acylating agents may be used in carrying out the esterification step in the process of my invention; among those which have been found to be useful are aromatic anhydrides, such as benzoic anhydride, phthalic anhydride and naphthalic anhydride, aromatic acyl halides, such as benzoyl chloride and substituted benzoyl chlorides, anhydrides and acyl halides of aliphatic dicarboxylic acids, such as adipic anhydride, sebacic anhydride, succinic anhydride, adipyl chloride, sebacyl chloride and succinyl chloride. It is to be understood, however, that the invention is not limited to these esterifying agents as any acylating agent or compatible mixture of such agents which will esterify vitamin D and produce esters which may be selectively extracted out from hydrocarbons such as squalene may be used.

The length of time necessary to carry out the esterification step will depend upon various factors, such as temperatures used, amounts of reagents, whether a catalyst is used or not, the type of material contained in the unsaponifiable matter, the amount of unsaponifiable matter, etc. Usually the esterification may be carried out at room temperature; however, if it is desired to accelerate the reaction, slightly elevated temperatures may well be used.

The same type of solvents as are used to extract the vitamin A may be used to extract the vitamin D esters. However, the vitamin D esters are not as soluble in these solvents as vitamin A and therefore more concentrated solutions of the solvents should be used to extract the vitamin D esters than are used to extract the vitamin A, e. g., 85% to 90% methanol, may be used to extract the vitamin A, whereas 91% to 95% methanol should be used to extract the vitamin D esters.

The extracted vitamin D esters are saponified to reconvert the same to the alcoholic form as the esters produced are biologically inactive. The saponification may be carried out in the solvent used as the extracting agent or that solvent may be removed from the esters and the esters saponified in another medium. After saponification the vitiman D is in the alcoholic form and may thus be readily separated from the saponified material by extracting the saponification mass with a suitable solvent for vitamin D, such as heptane, petroleum ether, ethyl ether, etc.

By the use of this process, highly potent concentrates of vitamin A and highly potent concentrates of vitamin D are obtained. These concentrates may be used for the same purposes for which ordinary concentrates are adapted. They may be used for pharmaceutical purposes, for fortifying foods, or any other similar purpose. Varying amounts of the vitamin A concentrate and of the vitamin D concentrate may be admixed with each other to obtain products containing any ratio of vitamin A to vitamin D desired. Likewise the vitamin A may be admixed with synthetic forms of vitamin D, i. e., activated ergosterol, cholesterol or 7-dehydro cholesterol.

This process may be used to prepare vitamin A concentrates and vitamin D concentrates from any material containing vitamins A and D. It is preferred, however, to treat the unsaponifiable fraction of fish liver and other vitamin A and D containing marine oils, such as the liver oils obtained from cod, halibut, swordfish, pollack, tuna, shark, ling cod, jew fish, whale and oils obtained from sardine, herring, and similar fish which contain relatively large amounts of both vitamins A and D in the unsaponifiable portion of the oil.

Although the unsaponifiable matter may be obtained from the oils in any usual way, it is preferred to use either the process disclosed and claimed in copending application of Buxton and Simons, Serial No. 333,114, filed May 3, 1940, now Patent No. 2,318,748, or the process disclosed and claimed in copending application of Buxton and Colman, Serial No. 350,166, filed August 2, 1940.

When a dicarboxylic anhydride has been used as the esterification agent, it may be desirable to treat the reaction mixture with an alkali metal compound before the vitamin D esters are extracted therefrom. The reason that it may be desired to do this is because in the process of esterification there may be produced on the anhydride, one free carboxyl group which is not esterified and by treating the reaction mixture with an alkali metal compound, such free carboxyl groups will be neutralized and alkali metal salts of the vitamin D esters produced. Such salts are usually more soluble in the solvents which are used to extract the vitamin D esters than are the esters themselves. Thus, for example 85% to 90% methanol may be used to extract the alkali metal salts of the vitamin D esters, whereas to extract the esters as such, 95% methanol should be used. Thus a better separation of the esterified material from the unesterified material may be obtained as the unesterified material is much less soluble in the less concentrated solvents. Naturally only enough of the alkali metal compounds to neutralize the free carboxyl group should be used as an excess may split the esters and it will thus be necessary to re-esterify the same.

For a fuller understanding of the nature and objects of the invention, reference should be had to the following example which is given merely to further illustrate the invention and is not to be construed in a limiting sense, all parts given being by weight.

*Example*

50 parts of a cod liver oil concentrate containing 457,000 units of vitamin A/gm. and 150,000 units of vitamin D/gm. prepared by saponifying cod liver oil and extracting the unsaponifiable material from the saponified mass, and then removing the cholesterol by dissolving the extracted material in absolute methanol, chilling the methanol solution to about $-15°$ C. and filtering off the methanol insoluble fraction, were dissolved in 616 parts of hexane. This solution was extracted three times with 85% methanol, using 500 parts of methanol for each extraction. The remaining solution was then extracted ten times with 500 part portions of 90% methanol. The combined methanol extracts were washed once with 1000 parts of hexane, and this hexane wash was rewashed with 500 parts of 85% methanol. The solvent was removed from both the hexane and methanol fractions. The residue from the methanol fraction contained 676,000 units of vitamin A/gm. Of the vitamin A contained in the original material, over 91% was concentrated in the residue from the methanol fraction. This fraction contained only a very small percentage of the original vitamin D content.

The residue from the hexane fraction was dissolved in 50 parts of redistilled pyridine in which had been dissolved 10 parts of phthalic anhydride. The mixture was allowed to stand in the dark at room temperature for 4 days. The mixture was then dissolved in 300 parts of petroleum ether and the pyridine removed by washing with a 50/50 mixture of methanol and water, which contained about 5% acetic acid. The first washing was re-extracted once with petroleum ether. The pyridine-free petroleum ether solution containing the esterified vitamin D and unesterified compounds was extracted 13 times with 200 part portions of 95% methanol. The combined methanol extracts were re-extracted twice with petroleum ether and the latter re-extracted twice with 95% methanol fractions, the solvent was removed from the combined methanol extracts, and the resulting residue saponified with 10% ethanolic KOH and then extracted with ethyl ether. The residue obtained on removing the ethyl ether was a concentrate containing over 800,000 units of vitamin D/gm.

The expressions "units of vitamin A" and "units of vitamin D" as used hereinabove refer to the U. S. P. units of the said vitamins. For the sake of brevity the expression "vitamin concentrate" is used in the appended claims to connote the unsaponifiable fraction of a fish or fish liver oil produced by saponification procedures. The expression "aliphatic hydrocarbon solvent" is employed in the appended claims to connote straight chain, branched chain and/or alicyclic hydrocarbon solvents.

Since certain changes may be made in carrying out the above process without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described my invention, what I claim as new and desire to secure by Letters Patent is:

1. A process of treating a vitamin A and D concentrate to separate vitamin A from vitamin D, which comprises dissolving the concentrate in an aliphatic hydrocarbon solvent, extracting vitamin A from the solution with an aqueous solution of a solvent selected from the group consisting of methanol, ethanol, isopropanol, diacetone alcohol, acetic acid and mixtures thereof, the water content of the extracting solution being adjusted so that the vitamin A will be dissolved to the substantial exclusion of vitamin D, esterifying the vitamin D in the solvent extracted mass and removing the esterified vitamin D by extraction with an aqueous solution of a solvent selected from the group consisting of methanol, ethanol, isopropanol, diacetone alcohol, acetic acid and mixtures thereof, the water content of this extracting solution being adjusted so that the vitamin D esters will be dissolved to the substantial exclusion of the hydrocarbons present including squalene.

2. A process of treating a vitamin A and D concentrate to separate vitamin A from vitamin D, which comprises dissolving the concentrate in an aliphatic hydrocarbon solvent, extracting vitamin A from the solution with methanol containing 6% to 15% water, esterifying the vitamin D in the solvent extracted mass and removing the esterified vitamin D by extraction with an aqueous solution of a solvent selected from the group consisting of methanol, ethanol, isopropanol, diacetone alcohol, acetic acid and mixtures thereof, the water content of this extracting solution being adjusted so that the vitamin D esters will be dissolved to the substantial exclusion of the hydrocarbons present including squalene.

3. A process of treating a vitamin A and D concentrate to separate vitamin A from vitamin D, which comprises dissolving the concentrate in an aliphatic hydrocarbon solvent, extracting vitamin A from the solution with an aqueous solution of a solvent selected from the group consisting of methanol, ethanol, isopropanol, diacetone alcohol, acetic acid and mixtures thereof, the water content of the extracting solution being adjusted so that the vitamin A will be dissolved to the substantial exclusion of vitamin D, esterifying the vitamin D in the solvent extracted mass with an acylating agent selected from the group consisting of the anhydrides and acyl halides of aromatic acids and aliphatic dicarboxylic acids and removing the esterified vitamin D by extraction with an aqueous solution of a solvent selected from the group consisting of methanol, ethanol, isopropanol, diacetone alcohol, acetic acid and mixtures thereof, the water content of this extracting solution being adjusted so that the vitamin D esters will be dissolved to the substantial exclusion of the hydrocarbons present including squalene.

4. A process of treating a vitamin A and D concentrate to separate vitamin A from vitamin D, which comprises dissolving the concentrate in an aliphatic hydrocarbon solvent, extracting vitamin A from the solution with methanol containing 6% to 15% moisture, esterifying the vitamin D in the solvent extracted mass with an acylating agent selected from the group consisting of the anhydrides and acyl halides of aromatic acids and aliphatic dicarboxylic acids and removing the esterified vitamin D by extraction with 91% to 95% methanol.

5. A process of treating a vitamin A and D concentrate to separate vitamin A from vitamin D, which comprises dissolving the concentrate in an aliphatic hydrocarbon solvent, extracting vitamin A from the solution with an aqueous solution of a solvent selected from the group consisting of methanol, ethanol, isopropanol, diacetone alcohol, acetic acid and mixtures thereof, the water content of the extracting solution being adjusted so that the vitamin A will be dissolved to the substantial exclusion of vitamin D, esterfying the vitamin D in the solvent extracted mass with phthalic anhydride and removing the esterified vitamin D by extraction with an aqueous solution of a solvent selected from the group consisting of methanol, ethanol, isopropanol, diacetone alcohol, acetic acid and mixtures thereof, the water content of this extracting solution being adjusted so that the vitamin D esters will be dissolved to the substantial exclusion of the hydrocarbons present including squalene.

6. A process of treating a vitamin A and D concentrate to separate vitamin A from vitamin D, which comprises dissolving the concentrate in an aliphatic hydrocarbon solvent, extracting vitamin A from the solution with an aqueous solution of a solvent selected from the group consisting of methanol, ethanol, isopropanol, diacetone alcohol, acetic acid and mixtures thereof, the water content of the extracting solution being adjusted so that the vitamin A will be dissolved to the substantial exclusion of vitamin D, esterifying the vitamin D in the solvent extracted mass with benzoyl chloride and removing the esterified vitamin D by extraction with an aqueous solution of a solvent selected from the group consisting of methanol, ethanol, isopropanol, diacetone alcohol, acetic acid and mixtures thereof, the water content of this extracting solution being adjusted so that the vitamin D esters will be dissolved to the substantial exclusion of the hydrocarbons present including squalene.

7. A process of treating a vitamin A and D concentrate to separate vitamin A from vitamin D, which comprises dissolving the concentrate in an aliphatic hydrocarbon solvent, extracting vitamin A from the solution with methanol containing 6% to 15% moisture, esterifying the vitamin D in the solvent extrated mass with phthalic anhydride and removing the esterified vitamin D by extraction with 91% to 95% methanol.

8. A process of treating a vitamin A and D concentrate to separate vitamin A from vitamin D, which comprises dissolving the concentrate in an aliphatic hydrocarbon solvent, extracting vitamin A from the solution with methanol containing 6% to 15% moisture, esterifying the vitamin D in the solvent extracted mass with benzoyl chloride and removing the esterified vitamin D by extraction with 91% to 95% methanol.

9. A process of treating a vitamin A and D concentrate to separate vitamin A from vitamin D, which comprises dissolving the concentrate in an aliphatic hydrocarbon solvent, extracting vitamin A from the solution with methanol containing 6% to 15% moisture, esterifying the vitamin D in the solvent extracted mass with phthalic anhydride in the presence of pyridine and removing the esterified vitamin D by extraction with 91% to 95% methanol.

10. A process of treating a vitamin A and D concentrate to separate vitamin A from vitamin D, which comprises dissolving the concentrate in an aliphatic hydrocarbon solvent, extracting vitamin A from the solution with methanol containing 6% to 15% moisture, esterifying the vitamin D in the solvent extracted mass with benzoyl chloride in the presence of pyridine and removing the esterified vitamin D by extraction with 91% to 95% methanol.

11. A process of treating a vitamin A and D concentrate to separate vitamin A from vitamin D, which comprises dissolving the concentrate in heptane, extracting vitamin A from the solution with methanol containing 6% to 15% moisture, esterifying the vitamin D in the solvent extracted mass with phthalic anhydride in the presence of pyridine and removing the esterified vitamin D by extraction with 91% to 95% methanol.

12. A process of treating a vitamin A and D concentrate to separate vitamin A from vitamin D, which comprises dissolving the concentrate in cyclohexane, extracting vitamin A from the solution with methanol containing 6% to 15% moisture, esterifying the vitamin D in the solvent extracted mass with phthalic anhydride in the presence of pyridine and removing the esterified vitamin D by extraction with 91% to 95% methanol.

13. A process of treating a vitamin A and D concentrate to separate vitamin A from vitamin D, which comprises dissolving the concentrate in heptane, extracting vitamin A from the solution with methanol containing 6% to 15% moisture, esterifying the vitamin D in the solvent extracted mass with phthalic anhydride in the presence of pyridine, removing the pyridine and removing the esterified vitamin D by extraction with 91% to 95% methanol.

LORAN O. BUXTON.